United States Patent
Prexl et al.

(10) Patent No.: US 8,841,895 B2
(45) Date of Patent: Sep. 23, 2014

(54) ELECTRONIC DEVICE FOR AVERAGE CURRENT MODE DC-DC CONVERSION

(75) Inventors: Franz Prexl, Niederding (DE); Juergen Neuhaeusler, Bad Aibling (DE)

(73) Assignee: Texas Instruments Deutschland GmbH, Freising (DE)

( * ) Notice: Subject to any disclaimer, the term of this patent is extended or adjusted under 35 U.S.C. 154(b) by 185 days.

(21) Appl. No.: 13/488,181

(22) Filed: Jun. 4, 2012

(65) Prior Publication Data

US 2013/0320949 A1  Dec. 5, 2013

(51) Int. Cl.
*G05F 1/00* (2006.01)
(52) U.S. Cl.
USPC ........................................ 323/282; 323/285
(58) Field of Classification Search
USPC ......... 323/222, 223, 271, 282, 283, 284, 285, 323/288, 344, 351
See application file for complete search history.

(56) References Cited

U.S. PATENT DOCUMENTS

| | | | |
|---|---|---|---|
| 7,518,346 B2 | 4/2009 | Prexl et al. | |
| 7,737,668 B2 * | 6/2010 | Oswald et al. | 323/259 |
| 8,085,005 B2 * | 12/2011 | Dearn | 323/222 |

OTHER PUBLICATIONS

"High Efficient Buck-Boost Converter Family TPS630XX," Texas Instruments, Freising, Germany, May 21, 2012, by Franz Prexl.

* cited by examiner

*Primary Examiner* — Nguyen Tran
(74) *Attorney, Agent, or Firm* — William B. Kempler; Frederick J. Telecky, Jr.

(57) ABSTRACT

An average current mode buck-boost DC to DC converter has a buck stage coupled between an input voltage source terminal and an output terminal. A boost stage is coupled between the input voltage source terminal and the output terminal. A current ramp control circuit generates a ramp signal for driving the buck and boost stages, the ramp signals being coupled to the buck and boost stages. A constant voltage related to the desired output voltage by a constant is applied directly to both a voltage control feedback loop for adjusting the output voltage and directly to an input to the current ramp control circuit, whereby the output voltage can be shifted from one voltage to another by feedforward control.

2 Claims, 1 Drawing Sheet

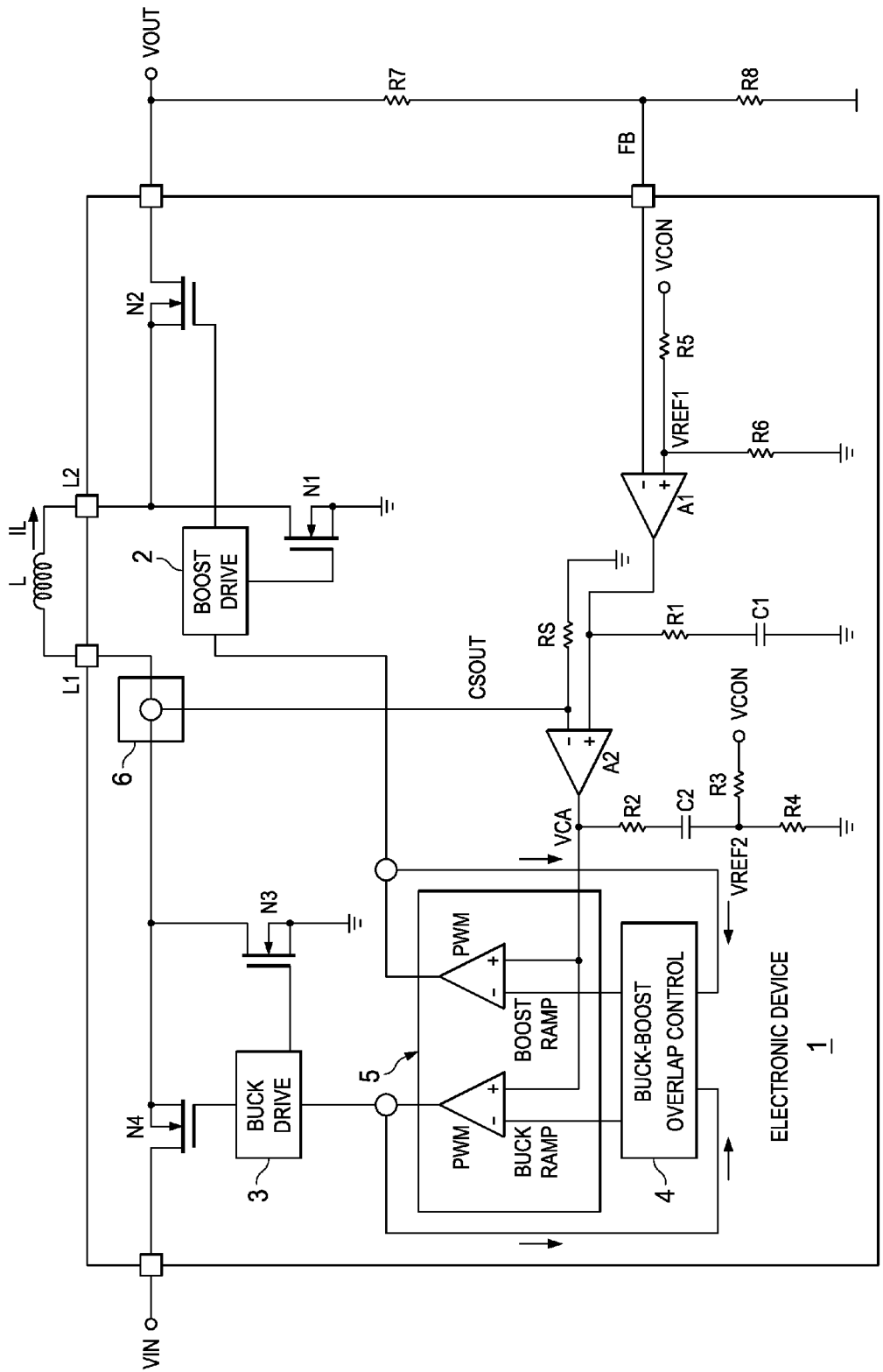

ELECTRONIC DEVICE FOR AVERAGE CURRENT MODE DC-DC CONVERSION

FIELD OF THE INVENTION

The invention relates to an electronic device for DC-DC conversion, and more specifically to an electronic device for buck, boost or buck-boost DC-DC conversion using an average current mode.

BACKGROUND OF THE INVENTION

High efficiency single inductor buck-boost DC-DC converters are well known in the art. An example of these types of DC-DC converters are the integrated semiconductor electronic devices of the TPS630xx series of Texas Instruments, which provide a power supply solution for products powered by either a two-cell or three-cell alkaline, NiCd or NiMH battery, or a one-cell Li-ion or Li-polymer battery. Output currents can go as high as 3 A, while using a single-cell Li-ion or Li-polymer battery and discharge it down to 2.5 V or lower. This known type of buck-boost converters is based on a fixed frequency, pulse-width-modulation (PWM) controller using synchronous rectification to obtain maximum efficiency. At low load currents, the converter enters power save mode to maintain high efficiency over a wide load current range. The power save mode can be disabled, forcing the converter to operate a fixed switching frequency. The maximum average current in the switches is limited to a typical value of 4 A. The output voltage is programmable using an external resistor divider, or it is fixed internally on the chip.

In order to optimize efficiency and performance of certain applications of DC-DC conversion; for example, for power amplifiers in cellular phones, it is required to change the supply voltage level in accordance with the required output power.

Typical DC-DC converters, as the previously described DC-DC converters using the TPS630xx, series generate a precise output voltage from an input voltage that can vary within a specified range. The value of the output voltage is defined by a reference voltage. In order to change the output voltage, either the feedback divider or the reference voltage has to be changed to a new value. In both cases, the response at the output node of the DC-DC converter is limited by the bandwidth of the control loop of the DC-DC converter.

SUMMARY OF THE INVENTION

It is a general object of the invention to provide an electronic device for DC-DC conversion that can adjust the output voltage without being constrained by the bandwidth of the control loop of the DC-DC converter.

According to one aspect of the invention, an electronic device for DC-DC conversion is provided. The aspects of the invention apply to buck converters, boost converters or buck-boost converters. The electronic device converts an input voltage into an output voltage by switching a current through an inductor as known in the art. The electronic device may comprise a first transconductance amplifier having an inverting input, a non-inverting input and an output. There may further be a second transconductance amplifier having an inverting input, a non-inverting input and an output. Furthermore, there may be a first resistor, a second resistor, a first capacitor, a second capacitor, a current sensing stage for sensing a value of a current through the inductor and a current ramp control stage for controlling the ramps of the currents through the inductor in a buck-mode as well as in a boost-mode of the DC-DC converter. The inverting input of the first transconductance amplifier may then be coupled to receive a feedback voltage that is derived from the output voltage. The output of the first transconductance amplifier may be coupled to the non-inverting input of the second transconductance amplifier and to a first side of the first resistor. The second side of the first resistor may be coupled to a first side of the first capacitor. The second side of the first capacitor may be coupled to ground. The inverting input of the second transconductance amplifier may be coupled to an output of the current sensing stage. The output of the second transconductance amplifier may be coupled to the current ramp control stage and to a first side of the second resistor. The second side of the second resistor may be coupled to a first side of the second capacitor. The second side of the second capacitor may be coupled to receive a first reference voltage. The non-inverting input of the first transconductance amplifier may be coupled to receive a second reference voltage. The first reference voltage is then proportional to the second reference voltage and both reference voltages are controlled, in order to change the output voltage of the electronic device by adjusting the first and second reference voltage levels at the same time.

This aspect of the invention provides that the adjustment of the output voltage is not limited by the bandwidth of the control loop. Since the rising ramp of the current through the inductor in the buck-mode is proportional to the input voltage, and the falling ramp of the current through the inductor in the boost-mode of the DC-DC conversion is proportional to output voltage, the output signal of the second transconductance amplifier represents the duty cycle which is proportional to the output voltage in a steady state condition.

According to an aspect of the invention, the first reference voltage may be derived from the control voltage using a first resistive voltage divider. The second reference voltage may be derived from the control voltage using a second resistive voltage divider. This aspect of the invention provides a simple mechanism to keep the first reference voltage proportional to the second reference voltage and to control both voltages with the single control voltage. If the second resistive voltage divider is coupled to the second side of the second capacitor, the duty cycle is immediately set close to the correct value. The current and voltage control loops still operate properly and provide the required accuracy of the output voltage.

According to an aspect of the invention, an average current mode buck-boost DC to DC converter comprising a buck stage coupled between an input voltage source terminal and an output terminal; a boost stage coupled between the input voltage source terminal and the output terminal; a current ramp control circuit generating a ramp signal for driving the buck and boost stages, the ramp signals being coupled to the buck and boost stages; a constant voltage related to the desired output voltage by a constant being applied directly to both a voltage control feedback loop for adjusting the output voltage and directly to an input to the current ramp control circuit; whereby the output voltage can be shifted from one voltage to another by feedforward control.

According to an aspect of the invention, a method of operating an average current mode buck-boost DC to DC converter comprising generating a voltage VCON related to a desired output voltage by a constant; applying VCON to a buck-boost current ramp control and substantially simultaneously applying VCON as a reference voltage for a voltage control loop; whereby a duty cycle of the converter can be directly set.

BRIEF DESCRIPTION OF DRAWINGS

Further aspects of the invention will appear from the appending claims and from the following detailed description given with reference to the appending drawings:

FIG. 1 shows a simplified circuit diagram of an electronic device, according to an embodiment of the invention.

DETAILED DESCRIPTION OF EXAMPLE EMBODIMENTS

FIG. 1 shows a simplified circuit diagram of an electronic device according to an embodiment of the invention. The electronic device 1, is an integrated semiconductor circuit. The solid line marks the limit of the integrated electronic device 1. However, parts which are shown outside the solid line may also be incorporated in the electronic device 1 in other embodiments.

The electronic device 1 includes several main components for implementing a buck-boost DC-DC converter in order to convert an input voltage VIN into an output voltage VOUT. However, the invention can also be applied to buck converters or boost converters or other types of DC-DC converters. The electronic deivce 1 comprises a first transconductance amplifier A1, a second transconductance amplifier A2, a boost-mode driving stage 2, a buck-mode driving stage 3, a buck-boost overlap control stage 4, a current ramp control stage 5 and a current sensing stage 6. Furthermore, there are two pairs of switches N1, N2 and N3, N4. The switches are NMOS transistors in this embodiment. NMOS transistors N1 and N2 are used for DC-DC conversion in boost-mode, when the output voltage level at node VOUT should be higher than input voltage level at node VIN. The NMOS transistors N3 and N4 are used for DC-DC conversion in a buck-mode, in which the output voltage level at VOUT is lower than the input voltage level at VIN. An inductor L may be coupled to nodes L1 and L2. The current through the inductor is IL.

The control gates of switches N1 and N2 are driven by boost-mode driving stage 2. The source of N1 is coupled to ground. The drain of N1 is coupled to node L2 and to the source of N2. The drain of N2 is coupled to node VOUT.

The control gates of switches N3 and N4 are driven by the buck-mode driving stage 3. The source of N3 is coupled to ground. The drain of N3 is coupled to node L1 and to the source of N4. The drain of N4 is coupled to VIN.

The buck-mode driving stage 3 and boost-mode driving stage 2 receive their driving signals from current ramp control stage 5.

Furthermore, electronic device 1 also includes resistors R1 to R6 and capacitors C1 and C2 as well as resistor RS.

A resistive divider R7, R8 may be coupled to the output node VOUT. The node between resistors R7 and R8 can be used as feedback node FB for sensing the output voltage.

The inverting input of the first transconductance amplifier A1 is coupled to feedback node FB. The output of the first transconductance amplifier A1 is coupled to the non-inverting input of the second transmconductance amplifier A2. The output of the first transconductance amplifier A1 is also coupled to a first side of resistor R1. The second side of resistor R1 is coupled to a first side of capacitor C1. The second side of capacitor C1 is coupled to ground. The inverting input of second transconductance amplifier A2 receives a signal CSOUT which is provided by current sensing stage 6. This signal CSOUT represents the value of current IL through the inductor L. A sensing resistor RS is coupled between the inverting input of transconductance amplifier A2 and ground.

The output of the second transconductance amplifier A2 is coupled to the current ramp control stage 5 and to a first side of resistor R2. The second side of resistor R2 is coupled to a first side of capacitor C2. The second side of capacitor C2 is coupled to voltage divider R3, R4 (resistors R3 and R4 are coupled in series). The voltage at the node between resistors R3 and R4 is referred to as second reference voltage VREF2. The node between resistors R5 and R6 is referred to as first reference voltage VREF1. Accordingly, the first reference voltage VREF1 is applied to the non-inverting input of the first transconductance amplifier A1 and the second reference voltage VREF2 is applied to the second side of capacitor C2. Both reference voltages VREF1, VREF2 are derived from a control voltage VCON through respective resistive dividers R3, R4 and R5, R6. This provides that the reference voltages VREF1 and VREF2 are proportional to each other. VREF1 and VREF2 are controlled by the same control voltage VCON. The voltage VCON may be related to the desired output voltage by a constant such as VOUT=VCON*G, where G is the constant.

In order to control the output voltage VOUT at all possible input voltage conditions VIN, the electronic device 1 automatically switches from buck operation to boost operation and vice versa. The electronic device 1 always configures the switches N1 to N4 such that there is one active switch, one rectifying switch, one switch permanently ON and one switch permanently OFF.

The electronic device 1 (in combination with the external components, some of which may not be shown) operates as a buck converter when the input voltage VIN is higher than the output voltage VOUT, and as a boost converter when the input voltage VIN is lower than the output voltage VOUT.

The average inductor current IL through the inductor L is regulated by a fast current regulator loop which is controlled by a voltage control loop. The non-inverting input of the first transconductance amplifier A1 can be assumed to be constant. The output of the transconductance amplifier A1 defines the average inductor current IL.

The buck-boost overlap control stage 4 provides that the classical buck-boost function is avoided in which two switches are ON every half a cycle. The buck-boost overlap control stage 4 provides that the current ramps in buck- and boost-mode are shifted away from each other, whenever all switches N1 to N4 are active during one clock cycle. If there are no switching activities of switches N1 to N4 due to a gap between the current ramps, the ramps are moved closer together.

Since the rising current ramp during buck-mode is proportional to the input voltage VIN and the falling current ramp in boost-mode is proportional to the output voltage VOUT, the output signal VCA of the second transconductance amplifier A2 represents the duty cycle D. Duty cycle D is equal to VOUT/F in a steady state condition. F is the proportionality factor.

Since the ratio VOUT/VCON is constant, the value of the duty cycle D may be directly set through the control signal VCON. As shown in FIG. 1, this may be easily achieved by connecting the integration capacitor C2 to a fraction (VREF2) of VCON instead of GND.

Whenever the control voltage VCON is changed, the duty cycle D is immediately set close to the correct and required value. The control loops using transconductance amplifiers A1 and A2 still operate properly and provide high accuracy of the output voltage VOUT.

If the ratio VOUT/VCON is set to G, the duty cycle D may be calculated as D=VCON*G/F unless VCON is internally divided to define another value.

The resistive dividers R3, R4 and R5, R6 may be arbitrarily set in order to obtain the required values.

Although the invention has been described in detail, it should be understood that various changes, substitutions and alterations, may be made thereto without departing from the spirit or scope of the invention as defined by the appended claims.

The invention claimed is:

1. An electronic device for DC-DC conversion of an input voltage into an output voltage using an inductor, the electronic device comprising:
    a first transconductance amplifier having an inverting input;
    a non-inverting input and an output and a second transconductance amplifier having an inverting input;
    a non-inverting input and an output;
    a first resistor, a second resistor;
    a first capacitor, a second capacitor;
    a current sensing stage for sensing a value of a current through the inductor and a current ramp control stage for controlling the ramps of the current through the inductor in a buck-mode and a boost-mode;
    wherein the inverting input of the first transconductance amplifier is coupled to receive a feedback voltage that is derived from the output voltage;
    the output of the first transconductance amplifier is coupled to the non-inverting input of the second transconductance amplifier and to a first side of the first resistor;
    the second side of the first resistor is coupled to a first side of the first capacitor;
    the second side of the first capacitor is coupled to ground;
    the inverting input of the second transconductance amplifier is coupled to an output of the current sensing stage;
    the output of the second transconductance amplifier is coupled to the current ramp control stage and to a first side of the second resistor;
    the second side of the second resistor is coupled to a first side of the second capacitor;
    the second side of the second capacitor is coupled to receive a first reference voltage;
    the non-inverting input of the first transconductance amplifier is coupled to receive a second reference voltage; and
    wherein the first reference voltage is proportional to the second reference voltage so as to change the output voltage of the electronic device by adjusting the first and the second reference voltage level.

2. The electronic device according to claim 1, wherein the first reference voltage is derived from a control voltage by a first resistive voltage divider and second reference voltage is derived from the control voltage by a second resistive voltage divider.

* * * * *